United States Patent [19]

Nakamura

[11] Patent Number: 4,778,984
[45] Date of Patent: Oct. 18, 1988

[54] APPARATUS FOR DETECTING FOCUS FROM ASTIGMATISM

[75] Inventor: Yasuo Nakamura, Iruma, Japan

[73] Assignee: Canon Denshi Kabushiki Kaisha, Tokyo, Japan

[21] Appl. No.: 918,504

[22] Filed: Oct. 14, 1986

[30] Foreign Application Priority Data

Oct. 16, 1985 [JP] Japan ................ 60-230386
Oct. 16, 1985 [JP] Japan ................ 60-230387

[51] Int. Cl.⁴ .................................. G01J 1/20
[52] U.S. Cl. .......................... 250/201; 369/45
[58] Field of Search .......... 250/201 DF, 204, 201; 369/45, 46; 350/286

[56] References Cited

U.S. PATENT DOCUMENTS

| | | | |
|---|---|---|---|
| 4,079,247 | 3/1978 | Bricot et al. | 250/204 |
| 4,358,200 | 11/1982 | Heemskerk et al. | 356/123 |
| 4,368,526 | 1/1983 | Harigae et al. | 250/201 DF |
| 4,376,303 | 3/1983 | Lurie | 250/201 DF |
| 4,390,781 | 1/1983 | Musha | 369/45 |
| 4,482,803 | 11/1984 | Lacotte et al. | 369/45 |
| 4,505,584 | 3/1985 | Kato et al. | 250/201 DF |

Primary Examiner—David C. Nelms
Assistant Examiner—Michael Messinger
Attorney, Agent, or Firm—Fitzpatrick, Cella, Harper & Scinto

[57] ABSTRACT

Disclosed is a focus detection apparatus including a light source; focusing means for focusing a light beam emitted from the light source onto an object; a prism for reflecting the light beam from the light source by its surface and for allowing return light from the object to pass therethrough to cause an astigmatism; and detection means for detecting a focusing state of the light beam on the object from the astigmatism of the return light. In this apparatus, the detection means is arranged at a position opposite to the light source to sandwich the prism therebetween, and the return light emerges from a surface thereof different from the incident surface to be guided to the detection means.

16 Claims, 8 Drawing Sheets

APPARATUS FOR DETECTING FOCUS FROM ASTIGMATISM

BACKGROUND OF THE INVENTION

1. Field of the Invention

The present invention relates to a focus detection apparatus and, more particularly, to a focus detection apparatus which is suitable for an optical data recording/reproduction apparatus which records and reproduces various data on and from a recording medium, e.g., an optical disk.

2. Related Background Art

A typical focus detection apparatus of this type adopts a so-called astigmatism method described in U.S. Pat. No. 4,358,200. FIG. 1 exemplifies this. A light beam 42 emitted from a light source 41, e.g., a semiconductor laser, is reflected by a first surface 47 of a wedge-shaped plate 43, and forms a spot on a data track 46 of an optical disk 45 through an objective lens 44. A return light beam 49 reflected by the optical disk 45 is incident on the wedge-shaped plate 43 again through the objective lens 44 and is reflected by a second surface 48 thereof to emerge from the first surface 47. Then, the beam 49 is detected by a photosensor 550. The return light beam 49 causes an astigmatism when it passes through the wedge-shaped plate 43, and the shape of the beam spot on the photosensor 50 changes in accordance with the focusing state on the optical disk 45. When this change in shape of the beam spot is detected by four-divided reception surfaces of the photosensor 50, focus detection can be performed.

However, in the conventional apparatus described above, since the light source and the photosensor are arranged at the same side with respect to the wedge-shaped plate, they must be separated a given distance from each other in the direction of the optical axis of the objective lens (i.e., in the direction perpendicular to the surface of the optical disk) so that they can be operated without interfering each other, resulting in a thick apparatus.

In the conventional apparatus, the wedge-shaped plate 43 causes a coma in addition to the astigmatism, and the spot on the photosensor 50 cannot have an accurate circular shape or an elliptic shape, but is deformed as shown in FIGS. 2A, 2B, and 2C. Note that FIG. 2A shows a just-in-focus state, nnd FIGS. 2B and 2C respective show pre-focus and post-focus states. The deformed spot adversely influences focus detection.

SUMMARY OF THE INVENTION

It is an object of the present invention to provide a simple, thin focus detection apparatus which is free from the above drawbacks of the conventional apparatus.

It is another object of the present invention to provide a focus detection apparatus which is capable of accurate focus detection with a simple arrangement.

In order to achieve the above object, there is provided a focus detection apparatus comprising a light source; focusing means for focusing a light beam emitted from the light source onto an object; a prism for reflecting the light beam from the light source by its surface to guide the reflected light beam to the focusing means and for allowing return light from the object to pass therethrough to cause an astigmatism; and detection means for detecting a focusing state of the light beam on the object from the astigmatism of the return light, wherein the detection means is arranged at a position opposite to the light source to sandwich the prism therebetween, and the return light is emerged from a surface thereof different from the incident surface to be guided to the detection means.

According to another aspect of the present invention, an optical means for correcting an aberration other than the astigmatism caused by the prism is arranged between the prism and the detection means, thus allowing accurate focus detection.

DETAILED DESCRIPTION OF THE PREFERRED EMBODIMENTS

An embodiment of the present invention will be described hereinafter with reference to the accompanying drawings.

Figure 1:
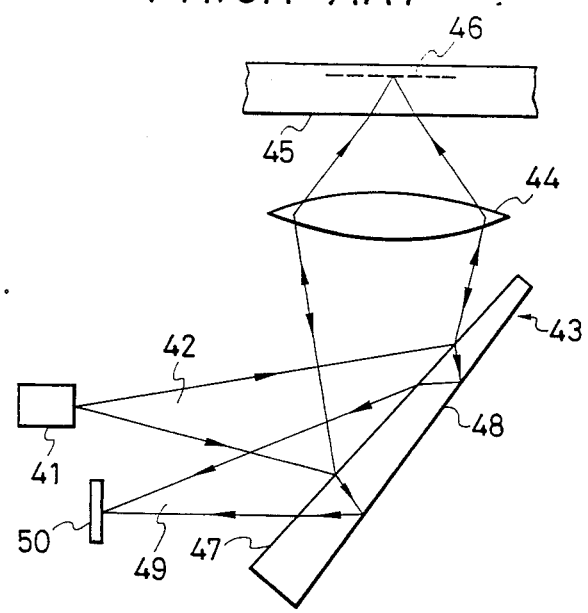
FIG. 1 is a schematic diagram showing a arrangement of a conventional focus detection apparatus.
Figure 2A:
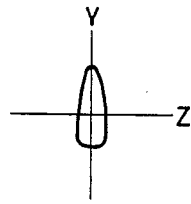
FIGS. 2A to 2C are schematic views showing the spot states on a photosensor of the conventional focus detection apparatus.
Figure 2B:
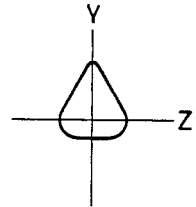
Figure 2C:
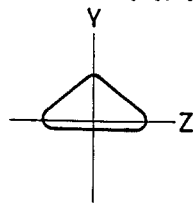
Figure 3:
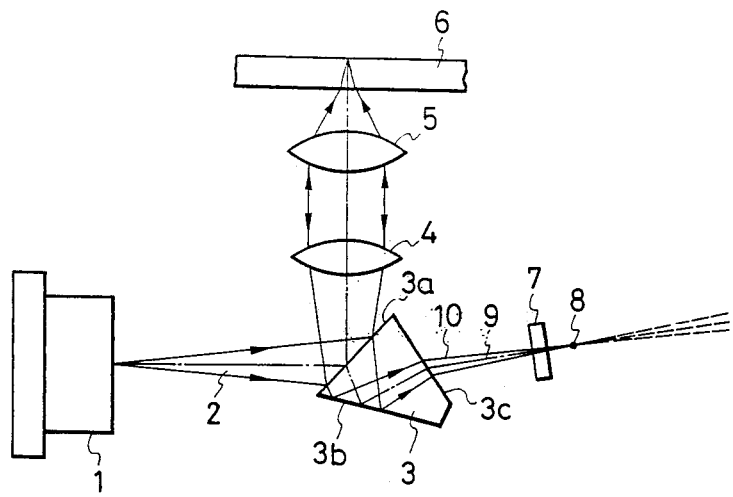
FIG. 3 is a schematic diagram showing an arrangement of a focus detection apparatus according to a first embodiment of the present invention.

FIG. 3 is a schematic diagram showing a first embodiment of the present invention. A light beam 2 emitted from a light source 1, e.g., a semiconductor laser, is partially reflected by a first surface 3a of a prism 3, and forms a spot on a data recording carrier 6 through a collimator lens 4 and an objective lens 5. A return light beam 10 reflected by the data recording carrier 6 passes again through the objective lens 5 and the collimator lens 4 to be converged light, and is partially incident on the first surface 3a of the prism 3. The light beam 10 is then reflected by an inner reflecting-film surface formed on a second surface 3b, and emerges from a third surface 3c of the prism 3, which is reflection-preventive treated with respect to the wavelength of light to be used. The light emerging from the surface 3c is detected by a photosensor 7 arranged at a position opposite to the light source 1 to sandwich the prism 3 therebetween.

Figure 4:
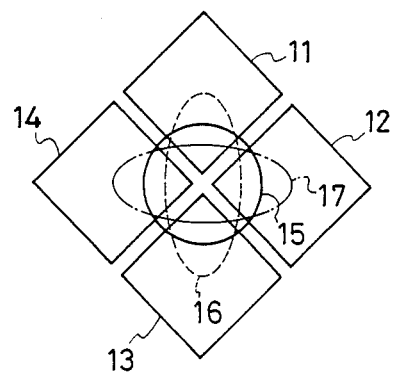
FIG. 4 is a schematic view showing a light-receiving surface of a photosensor of the first embodiment and a change in shape of a received beam spot.

The return light beam 10 causes an astigmatism when it passes through the prism 3, and the photosensor 7 is arranged at an appropriate position between a tangential convergence point 8 and a saggital convergence point 9 of the light beam 10. Assuming that a longitudinal magnification of the optical system is given by γ, and a change in distance between the data recording carrier 6 and the objective lens 5 is given by δ (δ=0 in the just-in-focus state), the convergence points 8 and 9 are moved only by about 2δ/γ, and upon this movement, the spot shape of the light beam on the photosensor 7 changes. The light-receiving surface of the photosensor 7 is divided by two orthogonal lines into light-receiving sections 11, 12, 13, and 14, as shown in FIG. 4, and can detect the focusing state of the light beam 2 to the data recording carrier 6 from the change in shape of the spot. For example, in the just-in-focus state (δ=0), the spot has a substantially circular shape, as indicated by numeral 15, and the amount of light incident on the respective light-receiving sections are substantially equal to each other. In contrast to this, when the objective lens 5 is too spaced apart from the data recording carrier 6 (δ is positive) and causes a so-called pre-focus state, the spot has a shape as indicated by numeral 16, so that the amount of light incident on the light-receiving sections 11 and 13 is relatively increased as compared to that incident on the light-receiving sections 12 and 14. When the objective lens 5 is too close to the data recording carrier 6 (δ is negative) and causes a so-called post-focus state, the spot has a shape as indicated by numeral 17, so that the amount of light incident on the light-receiving sections 12 and 14 is relativel increased as compared to that incident on the light-receiving sections 11 and 13. Therefore, a focus error signal (a so-called S curve) can be obtained from the difference between the sum signal of the light-receiving sections 11 and 13 and the sum signal of the light-receiving sections 12 and 14. In an optical data recording/reproduction apparatus, the objective lens 5 is moved along its optical axis on the basis of the focus error signal, thus performing focusing control.

Figure 5:
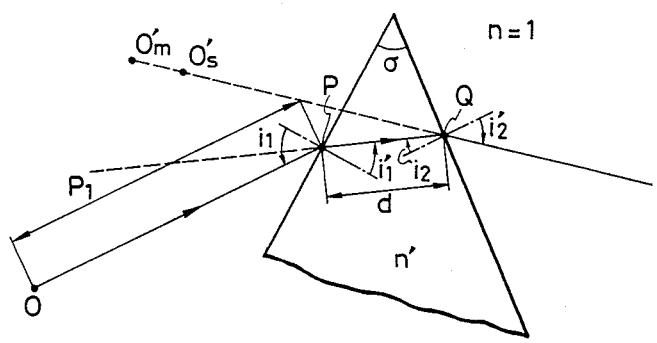
FIG. 5 is a schematic view for explaining the principle of causing an astigmatism by a prism.

FIG. 5 is a view for explaining the principle of generating an astigmatism by the prism. A case will be considered wherein a small light beam emitted from a point O is refracted at points P and Q on the prism surface in FIG. 5. If (virtual) convergence points of tangential and saggital light beams refracted at the point Q are given by Q'm and Q's, $\overline{OP}=P1$, and $\overline{PQ}=d$, an astigmatism ΔP' can be expressed by the following relation (1):

$$\Delta P' = \frac{d}{n'}\left(1 - \frac{\cos^2 i2'}{\cos^2 i2}\right) + P1\left(1 - \frac{\cos^2 i1}{\cos^2 i1'} \cdot \frac{\cos^2 i2'}{\cos^2 i2}\right) \quad (1)$$

where n' is a refractive index of the prism, i1 and i1' are an incident angle and an angle of refraction at the point P, and i2 and i2' are an incident angle and an angle of refraction at the point Q. A focus detection sensitivity in the above-mentioned apparatus can be determined by the relation (1) and a magnification of the optical system.

Figure 6:
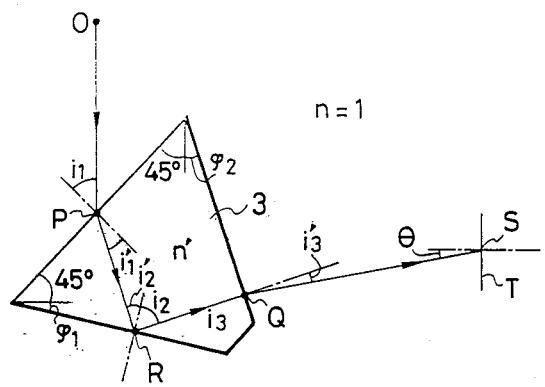
FIG. 6 is a schematic view for explaining light beam behavior incident on a prism of the first embodiment.

FIG. 6 is a schematic view showing light beam behavior incident on the prism 3 used in the first embodiment. Light emitted from a point O propagates via points P, R, Q, and S. In this case, an angle θ formed by a plane T substantially parallel to an optical axis incident on the data recording carrier surface and the light beam is important in terms of the optical system design. When this angle is set to be substantially 0°, the arrangement of the apparatus and manufacture of the respective mechanical parts can be simplified. Although a detailed method for deriving a relation is omitted, θ can be expressed by respective values shown in FIG. 6 as follows:

$$\theta = i'3 + \phi 2 \quad (2)$$

where i'3 is related to the refractive index n' of the prism, the incident angle i1 at the point P, and angles φ1 and φ2 of the prism on the basis of the Snell's law, and can be easily calculated.

As described above, with this design method, a compact, thin focus detection apparatus can be manufactured at low cost.

The brightness of an image formed on the surface of the photosensor by the prism of the first embodiment will be described hereinafter. In the above embodiment, light beams diverged or converged by the prism are incident on the surface of the photosensor. When divergence and convergence angles are large, differences between the transmittance and the reflectivity of a linearly polarized light component with respect to the respective surfaces of the prism become large (i.e., have an angle characteristic). Thus, when the plane of polarization of the light beam from the light source is inclined at about 45° with respect to a tangential surface so that S and P polarized light components are balanced with respect to the incident surface of the light beam, an average transmittance and reflectivity of the S and P polarized light components can be maintained substantially constant with respect to a change in incident angle of the light beam. This embodiment will be explained below.

Figure 7:
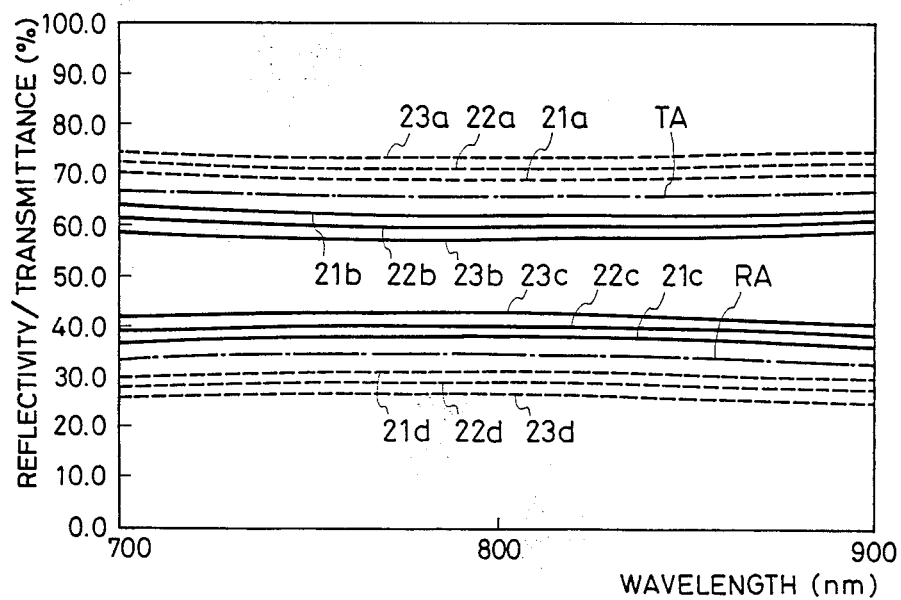
FIG. 7 is a graph showing polarized light reflectivity/transmittance characteristics of a light incident surface of the prism of the first embodiment.

FIG. 7 shows polarization characteristics of the first surface 3a of the prism used in the first embodiment (a surface for reflecting a light beam from the light source and directing it toward the collimator lens 4). In FIG. 7, three dotted lines above an average transmittance TA indicate transmittances of P polarized light, and three solid lines therebelow indicate those of S polarized light. Three dotted lines below an average reflectivity RA indicate the reflectivities of P polarized light and three solid lines thereabove indicate those of S polarized light.

More specifically, two sets of curves indicated by 21a to 21d, 22a to 22d, and 23a to 23d respectively indicate the transmittances and reflectivities of the P and S polarized light components when the incident angles to the first surface of the prism are set at 35°, 45°, and 55°, respectively. As can be seen from FIG. 7, when only the P or S polarized light component is used with respect to the first surface, the transmittance and reflectivity differ due to their angle characteristics. Therefore, taking the light beam reflected by the first surface into consideration, its brightness differs above and below a saggital plane of the light beam in accordance with the incident angle. Since this phenomenon occurs on the respective surfaces of the prism, an unnecessary gradation pattern is generated on a sensor surface, thus adversely influencing focus detection. For this reason, when the plane of polarization of the light beam from the light source is inclined through about 45° with respect to the saggital plane, the S and P polarized light components can be substantially balanced, and the angle characteristics can be eliminated as indicated by TA and RA, thus obtaining a good focus error signal.

When an optical thin film is formed on the reflection or transmission surface in the above embodiment, changes in transmittance and reflectivity can be reduced with respect to a change in incident angle of the light beam, as a matter of course.

A return light amount ratio to the light source will be explained below. A ratio of the amount of light returning to the light source via the collimator lens, the objective lens, and data carrier will be considered if the refractive index of the first surface of the prism described in the above embodiment is given by R. If the amount of light emitted from the light source is given by 100 and the transmittance of optical elements other than the first surface of the prism along an optical path extending from the light source via the data carrier and returning thereto is given by T, the return light amount ratio to the light source can be expressed by 100·T·R2 (%). When a semiconductor laser (LD) is used as the light source, a correlation is found between the amount of return light and an LD noise component. When the refractive index R of the first surface 3a of the prism having the return light amount ratio 100·T·R2 (%) is adjusted appropriately, the return light amount ratio to the LD changes, thus reducing the LD noise component.

Figure 8:
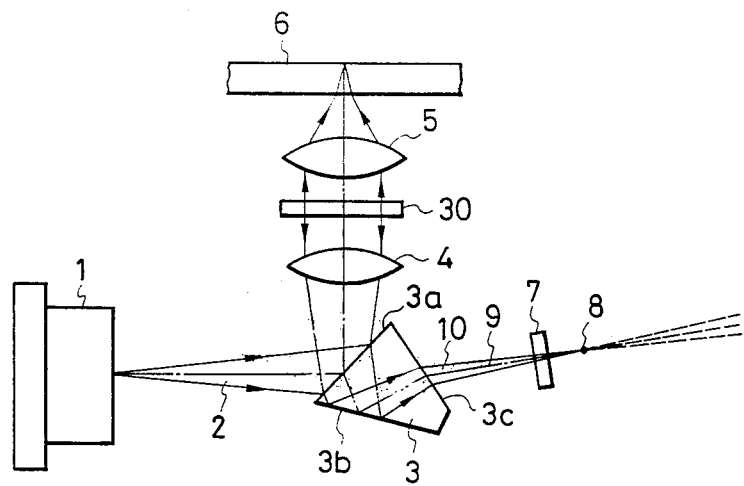
FIG. 8 is a schematic diagram showing the arrangement of a second embodiment of the present invention.

FIG. 8 is a schematic view showing a second embodiment of the present invention. The same reference numerals in FIG. 8 denote the same parts as in FIG. 3, and a detailed description thereof is omitted. In this embodiment, a ¼ wave plate (to be referred to as a λ/4 plate hereinafter) 30 is arranged between a collimator lens 4 and an objective lens 5, and an optical thin film having polarization characteristics is formed on a first surface 3a of a prism 3. The first surface 3a exhibits the polarization characteristics shown in FIG. 9. More specifically, the first surface 3a exhibits a transmittance of almost 100% as indicated by TP with respect to P polarized light and almost 100% of S polarized light is reflected without being transmitted therethrough. TA indicates an average transmittance.

Referring to FIG. 8, if a light beam 2 from a light source 1 is set to be S polarized light, the light beam 2 is mostly reflected by the surface 3a, is converted to clockwise circularly polarized light by the λ/4 plate 30, and is then incident on a data recording carrier 6. Return light reflected by the carrier 6 is counterclockwise circularly polarized light and again passes through the λ/4 plate 30 to be P polarized light. Then, the light mostly transmits through the first surface 3a of the prism, and is then guided to the photosensor 7. With the above arrangement of this embodiment, the return light to the light source 1 can be eliminated to constitute an isolator, and the amount of light incident on the photosensor 7 can be increased to improve energy efficiency.

When a noise level can be reduced by guiding a given amount of return light to the light source, as described above, the crystallographic axis direction of the λ/4 plate 30 can be appropriately rotated to adjust the amount of return light.

Figure 10:
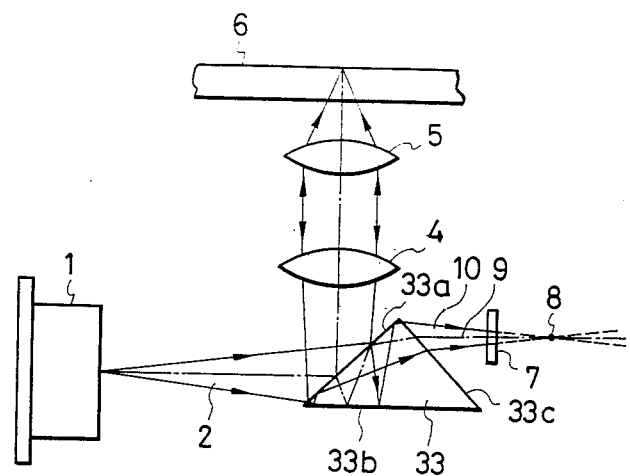
FIG. 10 is a schematic diagram showing the arrangement of a third embodiment.

FIG. 10 is a schematic view showing a third embodiment of the present invention. The arrangement of this embodiment is substantially the same as that of the first embodiment, except that the prism 3 shown in FIG. 3 is replaced with a prism 33 having a different shape. The same reference numerals in FIG. 10 denote the same parts as in FIG. 3, and a detailed description thereof will be omitted.

A return light beam 10 incident from a first surface 33a of the prism 33 is reflected by a reflection film formed on a second surface 33b, is totally reflected by the first surface 33a, and is then emerged from a third surface 33c to be guided to a photosensor 7. In this embodiment, when a return light beam is reflected twice by the inner surfaces of the prism, an optical path length inside the prism can be prolonged, and a distance between the prism and the photosensor can be shortened as compared to that of the first embodiment, thus providing a further compact apparatus. In this embodiment, since a light beam emitted from the light source can be set to be substantially parallel to that emerging from the prism, optical adjustment can be simplified and this is also advantageous for providing a thin apparatus.

Figure 11:
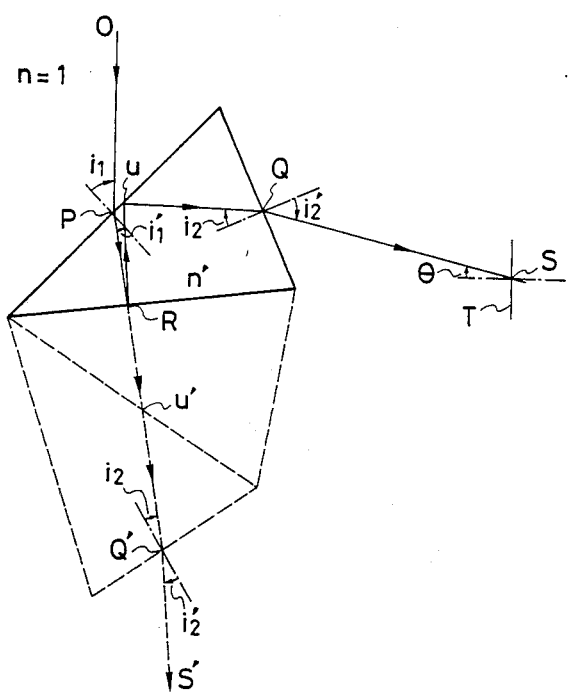
FIG. 11 is a schematic view showing light beam behavior incident on a prism of the third embodiment.

FIG. 11 is a schematic view showing light beam behavior incident into the prism 33 used in the third embodiment. In this case, a plane including an incident point P can be substantially parallel to that including an image Q' at an emerging point Q. When both the planes are determined in this manner, the same effect as that of flat parallel plates can be obtained by a simple element, i.e., a prism, and the number of parts in the optical system can be reduced. Under the above conditions, since i1=i2' and i1'=i2 in FIG. 11, the right side of the relation (1) becomes zero, and if the distance between the flat parallel planes is given by d0, the astigmatism can be expressed by the following relation (3):

$$\Delta P' = \frac{d0}{n'\cos i1'} \left(1 - \frac{\cos^2 i2'}{\cos^2 i2}\right) \qquad (3)$$
$$= \frac{d0}{n'\cos i1'} \left(1 - \frac{\cos^2 i1}{\cos^2 i1'}\right)$$

This relation represents the astigmatism caused by the flat parallel plates.

In the third embodiment, focus detection can be performed in accordance with the same principle as that of the first embodiment. The setting of the polarization direction described with reference to FIG. 7 can be similarly adopted in this embodiment.

Figure 12:
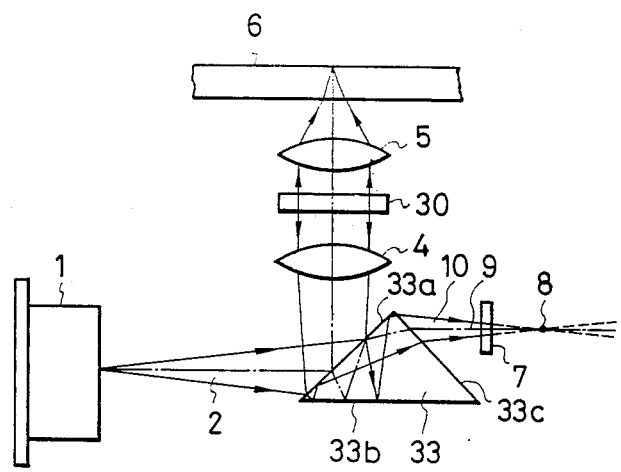
FIGS. 12 and 13 are schematic diagrams showing the arrangements of fourth and fifth embodiments of the present invention, respectively.

FIG. 12 shows a fourth embodiment of the present invention, in which a λ/4 plate 30 is added to the apparatus shown in FIG. 10. The same reference numerals in FIG. 12 denote the same parts as in FIG. 10, and a detailed description thereof will be omitted.

Figure 9:
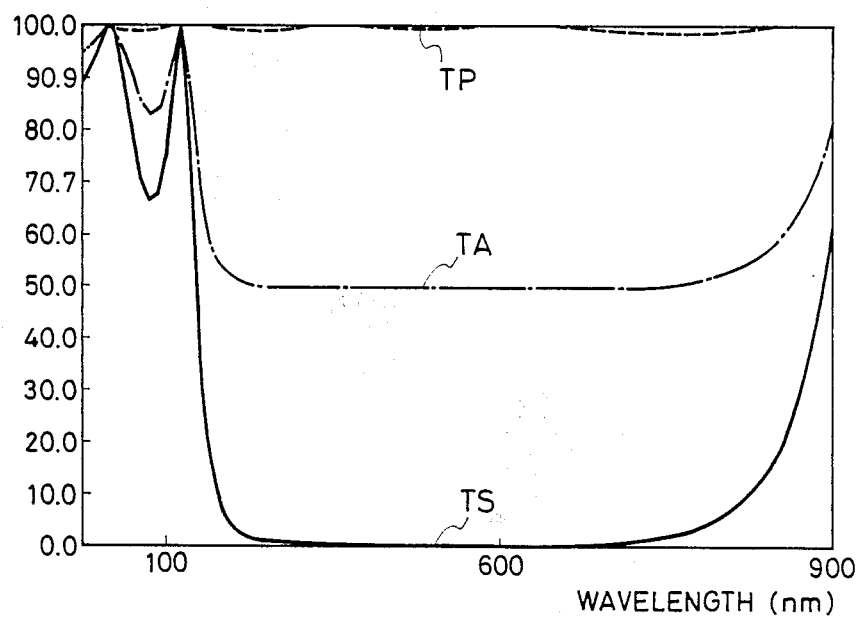
FIG. 9 is a graph showing polarized light transmittance characteristics of a light incident surface of a prism of the second embodiment.

An optical thin film exhibiting polarization characteristics shown in FIG. 9 is formed on a first surface 33a of the prism 33. Since an isolation function obtained by means of the first surface 33a and the λ/4 plate 30 is the same as that in the second embodiment, a description thereof is omitted. In this embodiment, focus detection can be performed in the same manner as in the above embodiments.

An embodiment of the present invention will be described wherein an optical means for correcting an aberration other than an astigmatism generated by a prism is arranged between a prism and a detection means.

Figure 13:
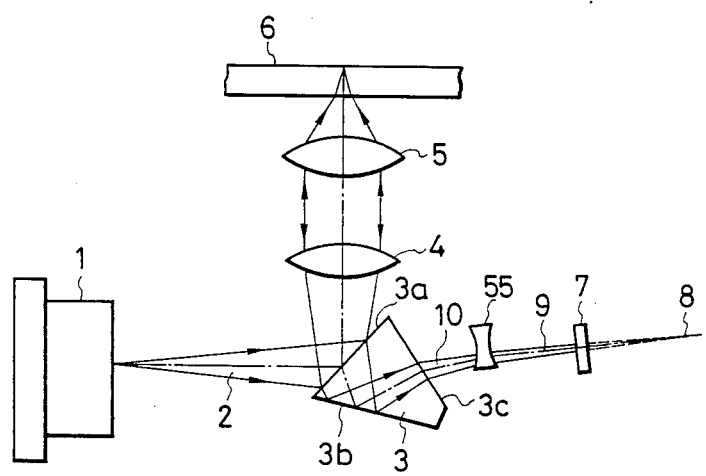

FIG. 13 is a schematic view showing a fifth embodiment of the present invention. The same reference numerals in FIG. 13 denote the same parts as in FIG. 3 and a detailed description thereof will be omitted. The difference between the fifth and the first embodiment is that a concave lens 55 is arranged between a prism 3 and a photosensor 7. The function of the concave lens 55 will be explained below.

The concave lens 55 is arranged so that its optical axis is separated from that of a return light beam 10 by a predetermined distance, thus causing a coma in the return light beam 10. As has been described in the description of the prior art, a light beam from the prism 3 includes the coma in addition to the astigmatism. In this embodiment, the coma caused by the prism is canceled by the coma generated by the concave lens 55, thus correcting the aberration other than the astigmatism. With this arrangement, the spot on the photosensor 7 in this embodiment can have a circular or an elliptic shape as shown in FIG. 4, and an accurate focus detection signal can be obtained from the photosensor.

An aberration generated by a lens will be described below in more detail. In an arbitrary optical system, aberration components $\Delta Y$ and $\Delta Z$ when an arbitrary block in the optical system is moved by E in the direction of a Y axis (a direction perpendicular to an optical axis if it is given by an X axis) can be expressed in an X-Y-Z system as follows:

$$\Delta Y = -\frac{1}{2ak'}[V(N_1 tg\omega)^3 \cos\phi_\omega + \qquad (1a)$$

$$R(N_1 tg\omega)^2\{2III\cos\phi_\omega\cos(\phi_R - \phi_\omega) + (III + P)\cos\phi_R\} +$$

$$R^2(N_1 tg\omega)II\{2\cos\phi_R\cos(\phi_R - \phi_\omega) + \cos\phi_\omega\} +$$

$$IR^3\cos\phi_R] - \frac{E}{2ak'}[(\Delta E) + (N_1 tg\omega)^2\{(VE)(2 + \cos 2\phi_\omega) -$$

$$(PE)\} \times 2R(N_1 tg\omega)[(IIIE)\{2\cos(\phi_R - \phi_\omega)) + \cos(\phi_R -$$

$$\phi_\omega)\} + (PE)\cos\phi_R\cos\phi_\omega] + (IIE)R^2(2 + \cos 2\phi_R)] -$$

$$\frac{E^2}{2ak'}[\{3(VE^2) - 2(PE^2)\}(N_1 tg\omega)\cos\phi_\omega + \{3(IIIE^2) +$$

$$(PE^2)\}R\cos\phi_R] - \frac{E^3}{2ak'}[(\Delta E^3)].$$

$$\Delta Z = -\frac{1}{2ak'}[V(N_1 tg\omega)^3 \sin\phi_\omega + \qquad (1b)$$

$$R(N_1 tg\omega)^2\{2III\sin\phi_\omega\cos(\phi_R - \phi_\omega) + (III + P)\sin\phi_R\} +$$

$$R^2(N_1 tg\omega)II\{2\sin\phi_R\cos(\phi_R - \phi_\omega) + \sin\phi_\omega\} +$$

$$IR^3\sin\phi_R] - \frac{E}{2ak'}[(VE)(N_1 tg\omega)^2\sin2\phi_\omega +$$

$$2R(N_1 tg\omega)\{(IIIE)\sin(\phi_R + \phi_\omega) + (PE)\sin\phi_R\cos\phi_\omega\} +$$

$$(IIE)R^2\sin2\phi_R] - \frac{E^2}{2ak'}[(VE^2)(N_1 tg\omega)\sin\phi_\omega +$$

$$[(IIIE^2) + (PE^2)\}R\sin\phi_k].$$

where the first term at the right side is a third-order aberration term inherent to the optical system when no decentration occurs, and the second term an thereafter are terms generated by decentration, in which the second term is proportional to $E^1$, and the third and fourth terms are proportional to $E^2$ and $E^3$, respectively. Decentration aberration coefficients included in the above relations have the following meanings.

Decentration aberration proportional to E ($\Delta E$) first-order prism effect (origin movement)
(VE): first-order decentration distortion
(PE): first-order decentration distortion additional term
*(IIIE): first-order decentration astigmatism
*(PE): first-order decentration astigmatism additional term (decentration curvature of field)
*(IIE): decentration coma (coma on an axis)

Decentration aberration proportional to $E^2$ ($VE^2$): second-order decentration distortion
($PE^2$): second-order decentration distortion additional term
*($IIIE^2$): second-order decentration astigmatism (astigmatism on an axis)
*($PE^2$): second-order decentration astigmatism additional term (decentration image point movement)

Decentration aberration proportional to $E^3$ ($\Delta E^3$): third-order prism effect (origin movement)

In addition, $\alpha = N \cdot u$, u is an angle formed by an optical axis and a light beam, and N is a refractive index.

Figure 14:
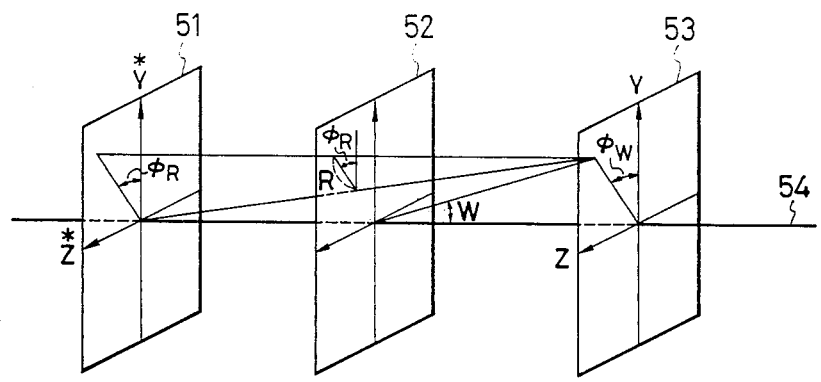
FIG. 14 is a schematic view for explaining generation of a coma by the prism.

As can be apparent from relations (1a) and (1b), when the lens is moved in the Y direction by E, a coma is generated in the negative direction. Meanwhile, when a light beam is incident at an obtuse angle with respect to the vertex angle of the prism, as shown in FIG. 14, the coma is generated in the positive direction. Therefore, the coma generated by the lens and the coma generated by the prism can be corrected. Referring to FIG. 14, an entrance pupil plane 51, a principle plane 52, and an object plane 53, are perpendicular to a reference axis 54. The concave lens 55 changes the longitudinal magnification to adjust a light-receiving range.

The explanation of the plane of polarization of a light beam incident on a prism and that of the ratio of return light to the light source described with reference to FIG. 7 in the first embodiment can be applied to this embodiment.

Figure 15:
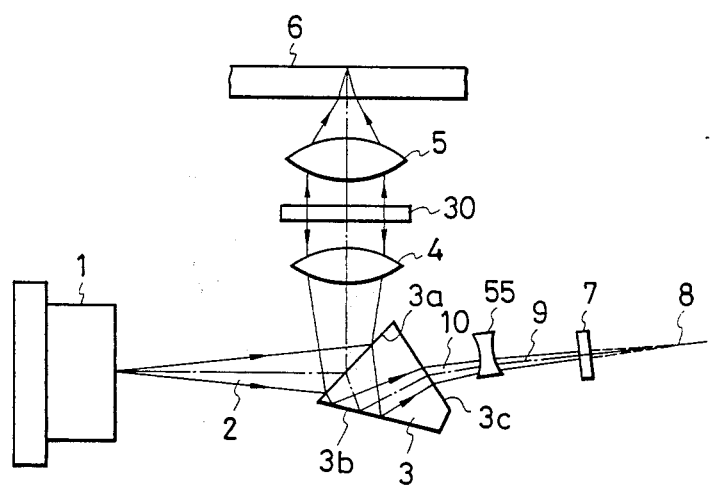
FIGS. 15, 16, and 17 are respectively schematic diagrams showing the arrangements of sixth, seventh, and eighth embodiments of the present invention.

FIG. 15 is a schematic view showing a sixth embodiment of the present invention, in which a concave less 55 is added to the arrangement of the second embodiment of the present invention shown in FIG. 8. The same reference numerals in FIG. 15 denote the same parts as in FIG. 8, and a detailed description thereof is omitted. The operation of this embodiment is the same as that of the second embodiment described previously. The concave lens 55 is similarly arranged between a prism 3 and a photosensor 7, and serves the same function as that described in the fifth embodiment.

Figure 16:
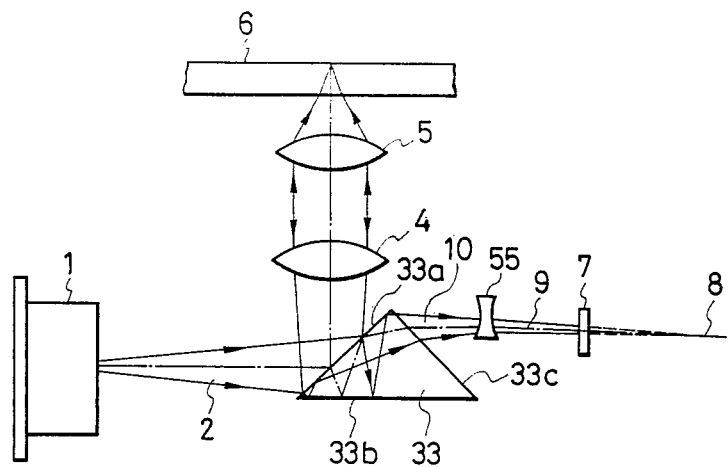

FIG. 16 is a schematic view showing a seventh embodiment of the present invention, in which a concave lens 55 is added to the arrangement of the third embodiment of the present invention shown in FIG. 10. The same reference numerals in FIG. 16 denote the same parts as in FIG. 10, and a detailed description thereof will be omitted. The operation of this embodiment is the same as that in the third embodiment described previously. The concave lens 55 is similarly arranged between a prism 33 and a photosensor 7, and serves the same function as that described in the fifth embodiment.

Figure 17:
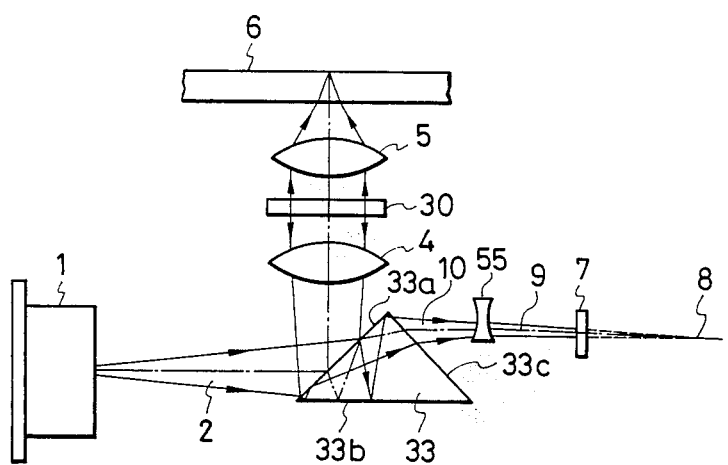

FIG. 17 is a schematic view showing an eighth embodiment of the present invention, in which a concave lens 55 is added to the arrangement of the fourth embodiment of the present invention shown in FIG. 12. The same reference numerals in FIG. 17 denote the same parts as in FIG. 12, and a detailed description thereof will be omitted. The operation of this embodiment is the same as that in the third embodiment described previously. The concave lens 55 is similarly arranged between a prism 33 and a photosensor 7, and serves the same function as that described in the fifth embodiment.

The present invention is not limited to the above embodiments, and various applications are possible. For example, the collimator lens and the objective lens can be constituted by a mold lens, a holographic lens, a refractive index distribution type lens, a flat-plate microlens, and the like. The collimator lens and the objective lens can be installed in a single barrel, or the optical system can be constituted by the optical elements. With this arrangement, the number of parts can be reduced as compared to a normally used lens which is installed in a barrel, and a low-cost compact optical system can be realized.

When the present invention is applied to an optical data recording/reproduction apparatus, in order to trace the light beam along the track of the data carrier, a grating can be inserted between the light source and the prism to perform tracking control by a known technique (a so-called three-beam technique). The present invention can be combined with other tracking techniques (e.g., a pupil plane push-pull technique, heterodyne technique, and the like).

In the fifth to eighth embodiments described above, in order to correct the coma, a lens which is parallel-moved along a direction orthogonal to the optical axis is inserted. Similarly, the lens whose optical axis is inclined can be inserted. In place of a normal lens, a holographic or refractive index distribution type lens ca be used.

What is claimed is:

1. A focus detection apparatus comprising:
    a light source;
    condensing means for condensing a first light beam emitted from said light source onto an object;
    prism means for reflecting the first light beam from said light source by a first prism surface to guide the first light beam toward said condensing means, and allowing a second light beam reflected from said object to transmit through said first surface, the second light beam being subjected to reflection off at least one inner surface and emerging from a second surface different from the first surface, thus causing an astigmatism in the return light beam, said prism being formed so that the first surface is parallel with an image of the second surface which is formed by inclining the second surface with respect to at least one inner surface that causes said at least one inner surface reflection; and
    detection means for detecting the focus state of the first light beam emitted onto said object from the astigmatism of the second light beam emerging from the second surface of said prism.

2. An apparatus according to claim 1, wherein an optical axis of the first light beam emitted from the light source and incident on the prism is substantially parallel to an optical axis of the second light beam emerging from the prism toward said detection means.

3. An apparatus according to claim 1, wherein said apparatus further comprises a ¼ wave plate arranged between said prism and an object plane, said light source emitting linearly polarized light polarized in a predetermined direction, and the first surface of said prism having a characteristic wherein the first surface reflects most of the polarized light in the predetermined direction and allows polarized light propagating in a direction perpendicular to the predetermined direction to mostly transmit therethrough.

4. An apparatus according to claim 1, wherein said light source emits linearly polarized light which is polarized in a direction which forms an angle of about 45° with respect to a tangential plane.

5. An apparatus according to claim 1, wherein said detection means is a photosensor, the light-receiving surface of which is divided into four sections by two orthogonal lines.

6. An apparatus according to claim 1, wherein said light source is a semiconductor laser.

7. An apparatus according to claim 1, wherein said condensing means is an objective lens.

8. A focus detection apparatus comprising:
    a light source;
    condensing means for condensing a first light beam emitted from said light source onto an object;
    a prism for reflecting the first light beam emitted from said light source by a surface to guide the first light beam toward said condensing means and allowing a second light beam reflected from said object to transmit through said surface to cause a plurality of aberrations, which include at least an astigmatism and a coma;
    detection means for detecting a focus state of the first light beam emitted onto said object from the astigmatism of the second light beam reflected from the object; and
    means for correcting the coma caused by said prism, said correcting means being arranged between said prism and said detection means.

9. An apparatus according to claim 8, wherein said correcting means consists of a lens having an optical axis separated from that of the second light beam.

10. An apparatus according to claim 9, wherein said lens is a concave lens.

11. An apparatus according to claim 8, wherein an optical axis of the first light beam emitted from the light source and incident on the prism is substantially parallel to an optical axis of the second light beam emerging from the prism toward said detection means.

12. An apparatus according to claim 8, wherein said apparatus further comprises a ¼ wave plate arranged between said prism and an object plane, said light source emitting linearly polarized light polarized in a predetermined direction, and the light incident surface of said prism having a characteristic wherein the light incidence surface reflects most of polarized light in the predetermined direction and allows polarized light propagating in a direction perpendicular to the predetermined direction to mostly transmit therethrough.

13. An apparatus according to claim 8, wherein said light source emits linearly polarized light which is polarized in a direction which forms an angle of about 45° with respect to a tangential plane.

14. An apparatus according to claim 8, wherein said detection means is a photosensor, the light-receiving surface of which is divided into four sections by two orthogonal lines.

15. An apparatus according to claim 8, wherein said light source is a semiconductor laser.

16. An apparatus according to claim 8, wherein said condensing means is an objective lens.

* * * * *

UNITED STATES PATENT AND TRADEMARK OFFICE
CERTIFICATE OF CORRECTION

PATENT NO. : 4,778,984

DATED : October 18, 1988

INVENTOR(S) : Yasuo Nakamura

It is certified that error appears in the above-identified patent and that said Letters Patent is hereby corrected as shown below:

ON TITLE PAGE:

[56]   References Cited:

"4,390,781 1/1983 Musha" should read --4,390,781 6/1983 Musha--.

COLUMN 1:

Line 25, "photosensor 550." should read --photosensor 50.--.

Line 47, "nnd" should read --and--.

Line 48, "respective" should read --respectively--.

COLUMN 3:

Line 36, "relativel" should read --relatively--.

COLUMN 6:

Line 19, "incident into" should read --incident on--.

COLUMN 7:

Line 35, "(PE)}" should read --(PE)}--.

Line 38, "$-2(PE^2)$}" should read -- $-2(PE^2)$}--

UNITED STATES PATENT AND TRADEMARK OFFICE
CERTIFICATE OF CORRECTION

PATENT NO. : 4,778,984

DATED : October 18, 1988

INVENTOR(S) : Yasuo Nakamura

It is certified that error appears in the above-identified patent and that said Letters Patent is hereby corrected as shown below:

COLUMN 7 Cont'd:

Line 59, "[(IIIE$^2$)" should read --{(IIIE$^2$)--.

Line 63, "an" should read --and--.

COLUMN 8:

Line 2, "( E)" should read --( E):--.

Line 5, "(PE):" should read --(PE):--.

Line 13, "(PE$^2$):" should read --(PE$^2$):

UNITED STATES PATENT AND TRADEMARK OFFICE
CERTIFICATE OF CORRECTION

PATENT NO. : 4,778,984

DATED : October 18, 1988

INVENTOR(S) : Yasuo Nakamura

It is certified that error appears in the above-identified patent and that said Letters Patent is hereby corrected as shown below:

COLUMN 9:

Line 34, "ca" should read --can--.

COLUMN 10:

Line 52, "incidence surface" should read --incident surface--.

Signed and Sealed this

Twenty-second Day of October, 1991

Attest:

HARRY F. MANBECK, JR.

*Attesting Officer*   *Commissioner of Patents and Trademarks*